United States Patent Office 3,511,859
Patented May 12, 1970

---

3,511,859
2,3-DIAZIDO/DIAMINO-5α-ANDROSTAN-17-ONES AND DERIVATIVES THEREOF
Paul D. Klimstra, Northbrook, Ill., assignor to G. D. Searle & Co., Chicago, Ill., a corporation of Delaware
No Drawing. Filed Apr. 23, 1968, Ser. No. 723,575
Int. Cl. C07c 117/00
U.S. Cl. 260—349                                    10 Claims

ABSTRACT OF THE DISCLOSURE 2,3-diazido/diamino-5α-androstan-17-ones and derivatives thereof useful as anti-protozoal agents. The diazido derivatives exhibit, in addition, anabolic, androgenic, antipepsin and anti-ulcerogenic activity, while the diamino compounds possess hypocholesterolemic, anti-inflammatory, anti-bacterial, anti-algal, anti-fungal and dicotyledonous seed germination-inhibitory properties also.

---

The present invention is concerned with novel compounds represented by the following structural formula

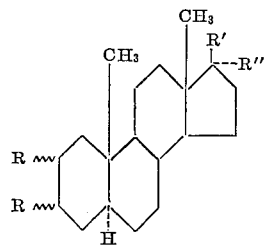

wherein R is an azido or amino radical, R' is a hydroxy radical and R'' is hydrogen or a lower alkyl radical; when R is azido, R' and R'' together comprise an oxo or methylene radical, and when R is amino, R' and R'' together comprise an oxo radical.

The lower alkyl radicals denoted by R' in the foregoing structural representation are typified by methyl, ethyl, propyl, butyl, pentyl, hexyl, heptyl and the branched-chain isomers thereof.

The compounds of the present invention are conveniently manufactured by processes which utilize 2,3-azido/oxygenated starting materials of the following structural formula

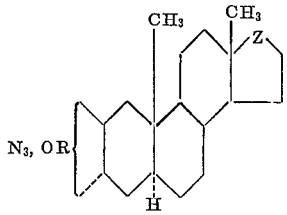

wherein Z comprehends carbonyl, ketalized carbonyl, hydroxymethylene and α-(lower alkyl)-β-hydroxymethylene radicals and the $N_3$ and OR substituents can be at either the 2 or 3 position and OR represents a suitable "leaving group," i.e. a group readily replaced. Representative of suitable "leaving groups" are methanesulfonyloxy, benzenesulfonyloxy and p-toluenesulfonyloxy. Typical starting materials together with methods for their manufacture are described in my copending application Ser. No. 580,888, filed Sept. 21, 1966, now U.S. Pat. No. 3,388,123.

Conversion of the instant starting materials to the corresponding 2,3-diazido compounds of this invention is conveniently achieved by reaction with an alkali metal azide in an aqueous medium. Water-miscible inert organic solvents such as dimethylformamide and dioxane thus are particularly useful to aid in solution of the steroid reactant. In order to minimize reaction time, the process is preferably conducted at the reflux temperature of the mixture. This process is exemplified by the reaction of 3α-azido-2β-hydroxy-5α-androstan-17-one 2-methanesulfonate with sodium azide in a dimethylformamide-water mixture to afford 2α,3α-diazido-5α-androstan-17-one.

When the starting material in the above process contains a [17-(lower alkyl)-17-hydroxy]methylene moiety, the instant 2,3-diazido-17-methylene derivatives are produced also. 3α-azido-17α-methyl-5α-androstane-2β,17β-diol 2-methanesulfonate thus affords 2α,3α-diazido-17-methylen-5α-androstane in addition to 2α,3α-diazido-17α-methyl-5α-androstan-17β-ol.

The instant 2,3-diamino compounds are conveniently obtained by catalytic hydrogenation of the aforementioned 2,3-diazido substances. Platinum is the preferred catalyst and the hydrogenation is readily conducted at pressures from atmospheric to about 5 atmospheres. A specific example is the hydrogenation at atmospheric pressure with platinum oxide of 2α,3α-diazido-5α-androstan-17β-ol, thus affording 2α,3α-diamino-5α-androstan-17β-ol.

The instant diamino compounds can be isolated in the form of their crystalline, non-toxic, pharmaceutically acceptable acid-addition and quaternary salts with which they are equivalent. Examples of suitable salts are the hydrochloride, hydrobromide, sulfate, phosphate, citrate, maleate, ascorbate, tartrate, oxalate succinate, methosulfate, ethosulfate, methochloride, methobromide, methiodide, ethiodide, etc.

A process particularly suitable for manufacture of the instant 2,3-diamino-17-keto substances utilizes as starting materials the 2,3-epoxy-17-ketals of the following structural formula

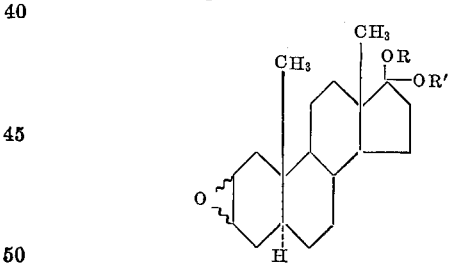

wherein R and R' represent lower alkyl radicals or R and R' together comprise a lower alkylene radical such as ethylene, trimethylene, tetramethylene, etc., and the wavy lines indicate the alternative α and β stereochemical configurations. Reaction of those epoxides with an alkali metal azide according to the procedure described in U.S. Pat. 3,238,194 results in the corresponding 2,3-azido/hydroxy intermediates, which are converted to the aforementioned 2,3-azido/oxygenated starting materials described in my copending application Ser. No. 580,888, filed Sept. 21, 1966. The latter substances are then converted to the instant 2,3-diamino derivatives by the procedures described hereinbefore and, as the last step, the 17-keto group is generated by cleavage of the ketal function. Those steps are specifically illustrated by the reaction of 2α,3α-epoxy-5α-androstan-17-one 17-ethylene ketal with sodium azide in aqueous dioxane to yield 3α-hydroxy-2β-azido-5α-androstan-17-one 17-ethylene ketal, acylation of the latter substance with methanesulfonyl chloride in pyridine, thus producing the corresponding 3-methanesulfonate, displacement of the 3-methanesulfonyloxy group by reaction with sodium azide in aqueous dimethylformamide to afford 2β,3β-diazido-5α-androstan-17-one 17-ethylene ketal, catalytic hydrogenation with platinum oxide of the latter substance to yield the corresponding 2β,3β-diamino compound, and removal of the ketal function by reaction with hydrochloric acid in aqueous methanol, thus producing the desired 2β,3β-diamino-5α-androstan-17-one.

The compounds of this invention exhibit valuable pharmacological properties. They are, for example, antiprotozoal agents, as is evidenced by their ability to inhibit the growth of such protozoa as *Tetrahymena gelleii*. That property is specifically illustrated by the activity of the following representative species:

2β,3β-diazido-5α-androstan-17β-ol,
2α,3α-diazido-17α-methyl-5α-androstan-17β-ol,
2α,3α-diazido-5α-androstan-17-one,
2β,3β-diamino-17α-methyl-5α-androstan-17β-ol dihydrochloride and
2α,3α-diamino-5α-androstan-17β-ol dihydrochloride when assayed by the following procedure:

A sterile nutrient medium of the following composition:
Proteose peptone—12 g.
Sucrose—8 g.
Distilled water—1000 ml.

was inoculated with a viable axenic culture of *Tetrahymena gellei*, then was incubated at about 25° C. for 24 hours. At the end of that time, 0.5 ml. quantities were transferred aseptically to test tubes containing approximately 5 mg. of the test compound. The test tubes containing the culture alone served as controls. At the end of a second 24 hour incubation period the tubes were examined microscopically in order to determine the degree of growth of the test organism. An active compound causes a definite inhibition of the growth of the organism as compared to the controls.

In addition, the instant 2,3-diazido compound display anabolic, androgenic, anti-pepsin and anti-ulceragenic activity.

The androgenic properties of those substances is specifically illustrated by the activity of 2α,3α-diazido-17α-methyl-5α-androstan-17β - ol and 2α,3α-diazido-17-methylen-5α-androstane when administered intramuscularly at a dose of 5 mg. in the following assay:

Corn oil solutions or suspensions of the test compound are administered daily for a period of 7 days to a group of castrated immature male rats. On the day after the last injection the animals are sacrificed and the seminal vesicles and ventral prostate glands removed, dissected free of extraneous tissue and weighed. Those weights are compared with the corresponding weights of organs taken from control animals, treated in the same manner save for omission of the test compound. The increases in weights of the seminal vesicles and the ventral prostate glands are used as a measure of androgenicity. A compound is rated active if it produces an increase in organ weights statistically significant at a probability level of less than 0.01.

The latter assay is that of Eisenberg and Gordan, J. Pharm. Exp. Therap., 99, 38 (1950) as modified by Saunders and Drill, Proc. Soc. Exper. Biol, and Med., 94, 646 (1957).

The instant 2,3-diamino compounds exhibit anti-inflammatory, hypocholesterolemic, anti-bacterial, specifically against *Diplococcus pneumoniae*, anti-algal, specifically against *Chlorella vulgaris*, anti-fungal, specifically against *Trichophyton mentagrophytes* and *Candida albicans*, and dicotyledonous seed germination-inhibitory activity. Their anti-inflammatory property is specifically illustrated by the activity of 2β,3β-diamino-5α-androstan-17β-ol dihydrochloride hemihydrate and 2β,3β-diamino-17α-methyl-5α-androstan-17β-ol dihydrochloride when administered subcutaneously to rats at a dose of 25 mg. The following assay was used:

Each of a group of 10 intact male rats weighing 100–130 g. is injected under the plantar surface of each hind foot with 0.1 ml. of a 1% solution of carrageenin (type 402, Marine Colloids, Inc.). The test compound, dissolved or suspended in saline, corn oil or propylene glycol, is administered subcutaneously 1 hour prior to the carrageenin injection. Another such group serving as controls is treated in the identical manner save for omission of the test compound. The edema resulting from carrageenin injection is determined by measuring the circumference of the hind foot, in arbitrary units, 5 hours after the carrageenin injection and subtracting the average swelling of the group treated with the test compound from the average swelling of the control group. Compounds are rated active if they produce a significant decrease ($P<0.05$) in the swelling observed in the control animals.

The novel compounds of this invention can be administered in any of a number of conventional pharmaceutical forms and also by conventional routes. For oral administration, suitable solid forms are pills, powders, capsules, tablets, and the like, and suitable liquid forms are syrups, emulsions, elixirs, suspensions, and the like. For parenteral administration, these compounds can be dispersed in an aqueous suspension or dissolved in a pharmacologically acceptable oil or oil-water emulsion. Suitable excipients can also be added.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade (° C.) and quantities of materials in parts by weight unless otherwise noted.

EXAMPLE 1

A solution of 10 parts of 2β,3β-epoxy-5α-androstan-17-one in 100 parts of ethanol is mixed with an aqueous solution consisting of 10 parts of sodium azide in 30 parts of water and the resulting reaction mixture is heated at the reflux temperature with stirring for about 24 hours. At the end of that reaction period, water is added to the point of turbidity and the mixture is cooled in order to induce crystallization. The crystals which form are collected by filtration and dried to afford 3α-azido-2β-hydroxy-5α-androstan-17-one, melting at about 156–157° and displaying an optical rotation, in chloroform, of +143.3°.

EXAMPLE 2

A mixture containing 9 parts of 3α-azido-2β-hydroxy-5α-androstan-17-one, 4 parts of methanesulfonyl chloride and 35 parts of pyridine is stored at room temperature for about 16 hours, then is poured into water. The resulting precipitate is collected by filtration, washed on the filter with water and triturated with acetone, thus affording 3α-azido-2β-hydroxy-5α - androstan-17 - one 2-methanesulfonate, melting at about 195–197°. It displays an optical rotation, in chloroform, of +120°.

EXAMPLE 3

To a solution of 7.5 parts of 3α-azido-2β-hydroxy-5α-androstan-17-one 2-methanesulfonate in 95 parts of dimethylformamide is added a solution of 5 parts of sodium azide in 17 parts of water and that reaction mixture is heated at the reflux temperature for about 5 hours. At the end of that time the mixture is diluted with water and ice and the resulting semi-solid precipitate is collected by filtration. Recrystallization of that crude product from aqueous methanol affords 2α,3α-diazido-5α-androstan-17-one, melting at about 122–123° and exhibiting an optical rotation, in chloroform, of +46°. This compound is represented by the following structural formula

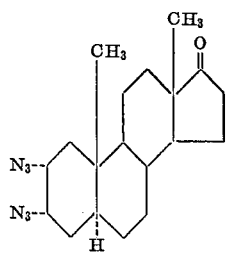

EXAMPLE 4

A solution of 10 parts of 3α - azido - 17α-methyl-5α-androstane-2β,17β-diol 2-methanesulfonate in 123.5 parts of dimethylformamide is combined with an aqueous solution containing 6.8 parts of sodium azide dissolved in 28 parts of water and the resulting reaction mixture is heated at the reflux temperature for about 10 hours, then is stored at room temperature for about 16 hours. At the end of that reaction period, the mixture is poured into water, then is extracted with ether. The ether extract is separated, washed with water dried over anhydrous sodium sulfate containing decolorizing carbon and stripped of solvent to afford a brownish oil. That crude material is dissolved in benzene and chromatographed on a silica gel column. Elution of the column with benzene affords 2α,3α-diazido-17-methylen-5α-androstane which, after recrystallization from acetone-methanol, melts at about 104°–106°. That compound is represented by the following structural formula

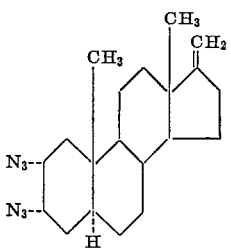

Further elution of the chromatographic column with 2% ethyl acetate in benzene produces, after recrystallization from aqueous methanol, 2α,3α-diazido-17α-methyl-5α-androstan-17β-ol, melting at about 124–126° and displaying an optical rotation, in chloroform, of −18°. This compound is represented by the following structural formula

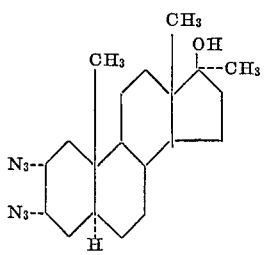

EXAMPLE 5

To a solution of 10 parts of 2β-azido-17α-methyl-5α-androstane - 3α,17β - diol 3-methanesulfonate in 76 parts of dimethylformamide is added a solution of 6.4 parts of sodium azide in 25 parts of water and the resulting solution is heated at the reflux temperature for about 10 hours, then is allowed to stand at room temperature for about 16 hours. The reaction mixture is poured carefully into water and the resulting aqueous mixture is extracted with ether. Washing of the ether extract with water followed by drying over anhydrous sodium sulfate containing decolorizing carbon and removal of the solvent by distillation under reduced pressure affords the crude product as an oil. That material is dissolved in benzene and chromatographed on a silica gel column. Elution of the column with benzene affords 2β,3β-diazido-17-methylen-5α-androstane, melting at about 64–65° with effervescence. Further elution of the column with 5% ethyl acetate in benzene affords, after recrystallization from aqueous methanol, 2β,3β-diazido-17α-methyl-5α-androstan-17β-ol, melting at about 90–92°. This compound is represented by the following structural formula

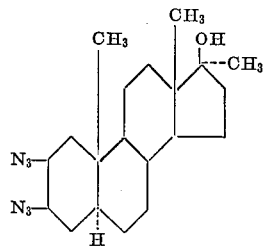

EXAMPLE 6

To a solution of 10 parts of 2β-azido-3α-hydroxy-5α-androstan-17-one 3-methanesulfonate in 95 parts of dimethylformamide is added an aqueous solution containing 6.4 parts of sodium azide dissolved in 25 parts of water. That reaction mixture is heated at the reflux temperature for about 5 hours, then is cooled and diluted successively with ice and water. Extraction of the resulting aqueous mixture with ether affords an organic solution, which is separated, washed with water, dried over anhydrous sodium sulfate containing decolorizing carbon and stripped of solvent under reduced pressure to afford the solid crude product. Purification of that material by recrystallization from methanol affords 2β,3β-diazido-5α-androstan-17-one, melting at about 166–168° and displaying an optical rotation, in chloroform, of +49°.

EXAMPLE 7

A solution of 1 part of 2β,3β-diazido-5α-androstan-17-one in 27 parts of tetrahydrofuran is cooled to 0–5° and a mixture consisting of 3 parts of lithium tri-(tertiarybutoxy) aluminum hydride in 18 parts of tetrahydrofuran is added. The resulting reaction mixture is stirred for about 1 hour, at the end of which time ice, water and excess 10% acetic acid are successively added. The resulting mixture is extracted with ether and the ether extract is separated, washed successively with water and dilute aqueous sodium bicarbonate, then dried over anhydrous sodium sulfate and distilled to dryness in an atmosphere of nitrogen. The initial oily residue solidifies upon standing and is further purified by recrystallization from aqueous methanol to yield pure 2β,3β-diazido-5α-androstan-17β-ol, characterized by an optical rotation, in chloroform, of −6°. This compound is represented by the following structural formula

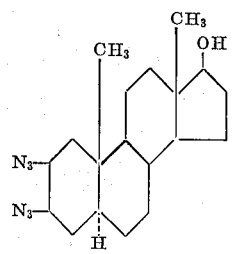

EXAMPLE 8

A mixture containing 1 part of 2α,3α-diazido-5α-androstan-17-one, 3.5 parts of lithium tri-(tertiarybutoxy) aluminum hydride and 45 parts of tetrahydrofuran is stirred at 0–5° for about 90 minutes, then is poured into a mixture containing ice, water and excess 10% acetic acid. The precipitate which forms is collected by filtration and purified by recrystallization from aqueous methanol to yield needle-like crystals of pure 2α,3α-diazido-5α-androstan-17β-ol, melting at about 139–141° and displaying an optical rotation, in chloroform, of −14.5°. It is represented by the following structural formula

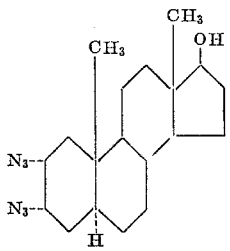

EXAMPLE 9

To a solution of 1.5 parts of 2α,3α-diazido-5α-androstan-17β-ol in 200 parts of ethanol is added 0.2 part of platinum oxide catalyst and the resulting mixture is shaken with hydrogen at atmospheric pressure and room temperature for about 24 hours. At the end of that reaction period the catalyst is removed by filtration and the solvent is distilled under reduced pressure. The resulting glass-like residue is extracted with ethyl acetate and excess isopropanolic hydrogen chloride is added to that organic solution. The crude salt which precipitates is collected by filtration, then is purified by recrystallization from methanol-ethyl acetate to afford needle-like crystals of 2α,3α-diamino-5α-androstan-17β-ol dihydrochloride, which exhibits an optical rotation, in chloroform, of +49.5°. This compound is represented by the following structural formula

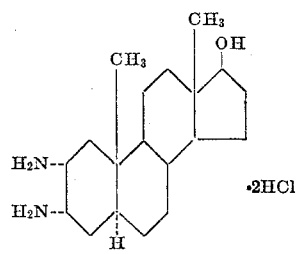

EXAMPLE 10

To a solution of 2 parts of 2α,3α-diazido-17α-methyl-5α-androstan-17β-ol in 200 parts of ethanol is added 0.2 part of platinum oxide catalyst and the resulting reaction mixture is shaken with hydrogen at room temperature and approximately 3 atmospheres pressure for approximately 24 hours. At the end of that time the catalyst is separated by filtration and the solvent is removed by distillation under reduced pressure. The resulting solid crude product is extracted with ethyl acetate and the extract is filtered, then combined with a solution of 1.5 parts of oxalic acid in ethyl acetate. The crude salt which precipitates is collected by filtration and washed on the filter with ethyl acetate, then is purified by recrystallization from ethanol to afford 2α,3α-diamino-17α-methyl-5α-androstan-17β-ol dioxalate. This compound is represented by the following structural formula

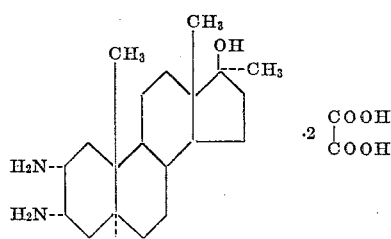

EXAMPLE 11

To a solution of 2 parts of 2β,3β-diazido-17α-methyl-5α-androstan-17β-ol in 40 parts of ethanol is added 0.2 part of platinum oxide catalyst and that hydrogenation mixture is shaken with hydrogen at room temperature and approximately 3 atmospheres pressure for about 24 hours. At the end of that time the catalyst is removed by filtration and the filtrate is evaporated to dryness to afford the crude product as an oil. That oily material is dissolved in a mixture of methanol and ethyl acetate, then is combined with excess isopropanolic hydrogen chloride. The resulting precipitate is collected by filtration and dried, thus affording 2β,3β-diamino-17α-methyl-5α-androstan-17β-ol dihydrochloride, which exhibits an optical rotation, in ethanol, of +4.5°. It is represented by the following structural formula

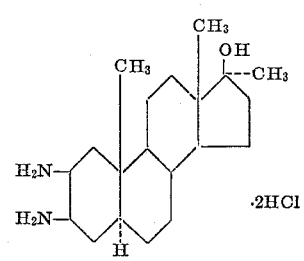

EXAMPLE 12

A solution containing 2 parts of 2β,3β-diazido-5α-androstan-17-one in 200 parts of ethanol is shaken with 0.2 part of platinum oxide catalyst in an atmosphere of hydrogen at room temperature and under approximately 3 atmospheres pressure for about 24 hours. At the end of that reaction period the catalyst is removed by filtration and the resulting filtrate is concentrated to dryness. The resulting solid crude product is extracted into methanol-ethyl acetate and the latter extract is combined with excess isopropanolic hydrogen chloride. The resulting precipitate is collected by filtration and dried in air to afford 2β,3β-diamino-5α-androstan-17β-ol dihydrochloride hemihydrate. This compound is represented by the following structural formula

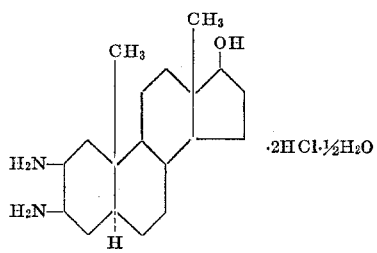

EXAMPLE 13

When an equivalent quantity of 2β-azido-17α-ethyl-5α-androstane-3α,17β-diol 3-methanesulfonate is substituted in the procedure of Example 5, there is produced 2β,3β-diazido-17α-ethyl-5α-androstan-17β-ol.

EXAMPLE 14

The substitution of an equivalent quantity of 3α-azido-17α-ethyl-5α-androstane-2β,17β-diol 2-methane-sulfonate in the procedure of Example 4 results in 2α,3α-diazido-17α-ethyl-5α-androstan-17β-ol.

EXAMPLE 15

By substituting an equivalent quantity of 2β,3β-diazido-17α-ethyl-5α-androstan-17β-ol and otherwise proceeding according to the processes described in Example 11, there is produced 2β,3β-diamino-17α-ethyl-5α-androstan-17β-ol.

EXAMPLE 16

The substitution of an equivalent quantity of 2α,3α-epoxy-5α-androstan-17-one 17-ethylene ketal in the procedure of Example 1 results in 2β-azido-3α-hydroxy-5α-androstan-17-one 17-ethylene ketal.

When an equivalent quantity of 2β-azido-3α-hydroxy-5α-androstan-17-one 17-ethylene ketal is substituted in the procedure of Example 2, there is produced 2β-azido-3α-hydroxy-5α-androstan-17-one 3-methanesulfonate, 17-ethylene ketal.

The substitution of an equivalent quantity of 2β-azido-3α-hydroxy-5α-androstan-17-one 3-methanesulfonate, 17-ethylene ketal in the procedure of Example 3 results in 2β,3β-diazido-5α-androstan-17-one 17-ethylene ketal.

When an equivalent quantity of 2β,3β-diazido-5α-androstan-17-one 17-ethylene ketal is substituted in the procedure of Example 9, there is produced 2β,3β-diamino-5α-androstan-17-one 17-ethylene ketal.

A mixture containing 5 parts of 2β,3β-diamino-5α-androstan-17-one 17-ethylene ketal, 40 parts of acetone and 50 parts by volume of 1 N hydrochloric acid is stored in a nitrogen atmosphere at room temperature for about 72 hours, at the end of which time the reaction mixture is partitioned between benzene and water. The benzene layer is separated, washed several times with dilute hydrochloric acid and water until neutral, then dried over anhydrous sodium sulfate and stripped of solvent under reduced pressure to afford 2β,3β-diamino-5α-androstan-17-one.

EXAMPLE 17

A mixture containing 2.8 parts of 3α-bromo-2β-hydroxy-5α-androstan-17-one, 50 parts by volume of 2-methyl-2-ethyl-1,3-dioxalane and 0.2 part of p-toluenesulfonic acid is slowly distilled over a period of about 48 hours in order to remove the butanone which is formed. At the end of that time the reaction mixture is cooled, diluted with benzene, then washed successively with dilute aqueous sodium bicarbonate and water, dried over anhydrous sodium sulfate, then concentrated to dryness to afford the crude product. Recrystallization of that material from acetone-hexane yields 3α-bromo-2β-hydroxy-5α-androstan-17-one 17-ethylene ketal.

To a solution of 5 parts of 3α-bromo-2β-hydroxy-5α-androstan-17-one 17-ethylene ketal in 300 parts of tetrahydrofuran is added a solution containing 1.5 parts of sodium carbonate dissolved in 100 parts of water. The resulting reaction mixture is stirred at room temperature for about 48 hours, then is diluted with ice and water. The precipitate which forms is collected by filtration, washed on the filter with water and dried, then recrystallized from acetone-hexane to afford 2β,3β-epoxy-5α-androstan-17-one 17-ethylene ketal.

The substitution of an equivalent quantity of 2β,3β-epoxy-5α-androstan-17-one 17-ethylene ketal in the procedure of Example 1 results in 3α-azido-2β-hydroxy-5α-androstan-17-one 17-ethylene ketal.

When an equivalent quantity of 3α-azido-2β-hydroxy-5α-androstan-17-one 17-ethylene ketal is substituted in the procedure of Example 2, there is produced 3α-azido-2β-hydroxy-5α-androstan-17-one 2-methanesulfonate, 17-ethylene ketal.

The substitution of an equivalent quantity of 3α-azido-2β-hydroxy-5α-androstan-17-one 2-methanesulfonate, 17-ethylene ketal in the procedure of Example 3 results in 2α,3α-diazido-5α-androstan-17-one 17-ethylene ketal.

When an equivalent quantity of 2α,3α-diazido-5α-androstan-17-one 17-ethylene ketal is substituted in the procedure of Example 9, there is produced 2α,3α-diamino-5α-androstan-17-one 17-ethylene ketal.

Removal of the ketal function by the substitution of an equivalent quantity of 2α,3α-diamino-5α-androstan-17-one 17-ethylene ketal in the procedure described in Example 16 results in 2α,3α-diamino-5α-androstan-17-one.

What is claimd is:
1. A compound of the formula

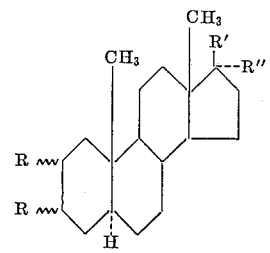

wherein R is a member of the class consisting of azido and amino radicals; when R is azido or amino R' is a hydroxy radical and R" is selected from the group consisting of hydrogen and a lower alkyl radical or R' and R" together comprise an oxo radical; when R is azido R' and R" together comprise an oxo or methylene radical, and the wavy line indicates the alternative α and β stereochemical configurations.

2. As in claim 1, a compound of the formula

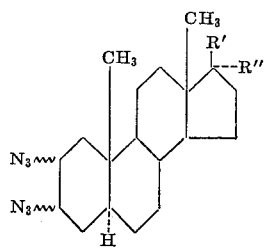

wherein R' is a hydroxy radical and R" is selected from the group consisting of hydrogen and a lower alkyl radical or R' and R" together comprises an oxo or methylene radical and the wavy lines indicate the alternative α and β stereochemical configurations.

3. As in claim 1, a compound of the formula

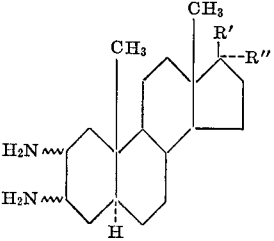

wherein R' is a hydroxy radical and R" is selected from the group consisting of hydrogen and a lower alkyl radical or R' and R" together comprise an oxo radical and the wavy lines indicate the alternative α and β stereochemical configurations.

4. As in claim 1, the compound which is 2β,3β-diazido-5α-androstan-17β-ol.

5. As in claim 1, the compound which is 2α,3α-diazido-17-methylen-5α-androstane.

6. As in claim 1, the compound which is 2α,3α-diazido-17α-methyl-5α-androstan-17β-ol.

7. As in claim 1, the compound which is 2β,3β-diamino-5α-androstan-17β-ol.

8. As in claim 1, the compound which is 2α,3α-diazido-5α-androstan-17-one.

9. As in claim 1, the compound which is 2β,3β-diamino-17α-methyl-5α-androstan-17β-ol.

10. As in claim 1, the compound which is 2α,3α-diamino-5α-androstan-17β-ol.

No references cited.

HENRY A. FRENCH, Primary Examiner

U.S. Cl. X.R.

260—239.55, 397, 397.3, 397.5, 999